United States Patent
Xie et al.

(10) Patent No.: US 7,184,022 B2
(45) Date of Patent: Feb. 27, 2007

(54) POSITION DETERMINATION AND MOTION TRACKING

(75) Inventors: Tong Xie, San Jose, CA (US); Douglas M. Baney, Los Altos, CA (US); Marshall T. DePue, San Mateo, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 327 days.

(21) Appl. No.: 10/759,646

(22) Filed: Jan. 16, 2004

(65) Prior Publication Data

US 2005/0156888 A1 Jul. 21, 2005

(51) Int. Cl.
*G09G 5/08* (2006.01)

(52) U.S. Cl. .................................. 345/166; 345/163
(58) Field of Classification Search ........ 345/156–163, 345/175, 178–179
See application file for complete search history.

(56) References Cited

U.S. PATENT DOCUMENTS

| 6,008,798 A | * | 12/1999 | Mato et al. | ................ 345/168 |
| 6,344,846 B1 | * | 2/2002 | Hines | .......................... 345/166 |
| 7,078,672 B2 | | 7/2006 | Xie et al. | |

* cited by examiner

*Primary Examiner*—Richard Hjerpe
*Assistant Examiner*—Duc Dinh

(57) ABSTRACT

Systems and methods for position determination and motion tracking for use in a processor based system. Embodiments may incorporate a redirector that moves in at least one direction about a fixed point, an object operable to reflect a search beam as a location beam, logic operable to determine at least one angle of position for the object from the orientation of the redirector, and logic operable to determine a distance of the object from a fixed point.

16 Claims, 4 Drawing Sheets

POSITION DETERMINATION AND MOTION TRACKING

CROSS-REFERENCE TO RELATED APPLICATIONS

The present application is related to concurrently filed, co-pending, and commonly assigned U.S. patent application Ser. No. 10/758,981, entitled "METHOD AND SYSTEM FOR OPTICALLY TRACKING A TARGET USING AN INTERFEROMETRIC TECHNIQUE," the disclosure of which is hereby incorporated herein by reference.

TECHNICAL FIELD

The invention is directed to the field of position determination and motion tracking, and more specifically towards navigation for input to a processor based system.

BACKGROUND OF THE INVENTION

Current computer input devices, such as a roller-ball mouse, optical mouse, and other pointing devices track their position through surface-to-mouse relative motion. When a typical roller-ball mouse moves across a surface, an internal ball turns and drives an optical encoder that counts the number of steps in the X direction and the number of steps in the Y direction. A computer uses this information to determine how far in each coordinate the cursor should move relative to its previous position. A typical optical-mouse uses a camera to capture successive images of the surface, and compares these images to calculate how far the mouse has moved relative to the previous position. Both the roller-ball mouse and the optical mouse thus determine relative movement, and neither uses a fixed reference frame.

BRIEF SUMMARY OF THE INVENTION

In accordance with the invention it is possible to determine the position of an object relative to a reference point. Through repeated determination of an object's position, it is possible to track the object's motion within a reference frame.

In accordance with the invention, a beam of light can sweep about a reference point and through defined arcs that correspond to a search area. An object, when appropriately arranged, will reflect this beam when placed within the search area. The angle of the beam at the time of reflection is used as one position coordinate for the object within a reference frame. The reflected beam is directed to a detector where it combines with a control beam to form an interference pattern. Through interferometry, the object's distance from the reference point is calculated from the interference pattern and is used as a second position coordinate of the object within the reference frame. The calculated distance is combined with the angle of the light beam at the moment of reflection to define the object's position in two dimensions relative to the reference point. Motion of the object is tracked by repeatedly determining the object's position.

In accordance with the invention a reflector, such as a retroreflector, can be affixed to the object, causing the beam to be reflected back along it's incident path. A broadband radiation source may also be used to produce the beam and with a system adapted to use low-coherence interferometry precisely determine the object's distance from a reference point. In accordance with the invention these systems and methods can provide input device navigation in processor based systems.

DETAILED DESCRIPTION

A motion relative tracking system typically cannot locate an object's position, and thus determines movement only in relation to a starting point. A system that uses a reference frame has the advantage of being able to determine the position of an object relative to a reference point, and further motion of the object can be precisely tracked if the position of that object is repeatedly determined. For applications such as computer input, tracking motion in this manner provides distinct advantages over traditional motion-relative methods. For example, if a track-ball mouse is lifted from the surface, moved to a new location, and then returned to the surface, a system that determines relative motion would be unable to track this movement. A system that tracks movement through position determination, however, would be capable of tracking this movement.

In order to locate an object in space with respect to a fixed origin, one coordinate should be known for each dimension of space. To locate an object in two-dimensional space, for example, two coordinates are typically used. In polar coordinates, a convenient two-dimensional coordinate system, an object's position can be fully defined in two-dimensional space using that object's distance from a fixed origin as one coordinate of position, and using the angle a line connecting the object and the origin makes with respect to a predetermined 0° orientation as a second coordinate of position. For a three-dimensional system, three coordinates are typically used. In a spherical coordinate system, a convenient three-dimensional coordinate system, an object's position can be described using the distance of the object from a fixed origin as a first coordinate, the angle a line connecting the object and the origin makes with respect to a first 0° orientation (e.g. azimuth) as a second coordinate, and the angle the line makes with a second 0° orientation (e.g. elevation) as a third coordinate.

Figure 1:
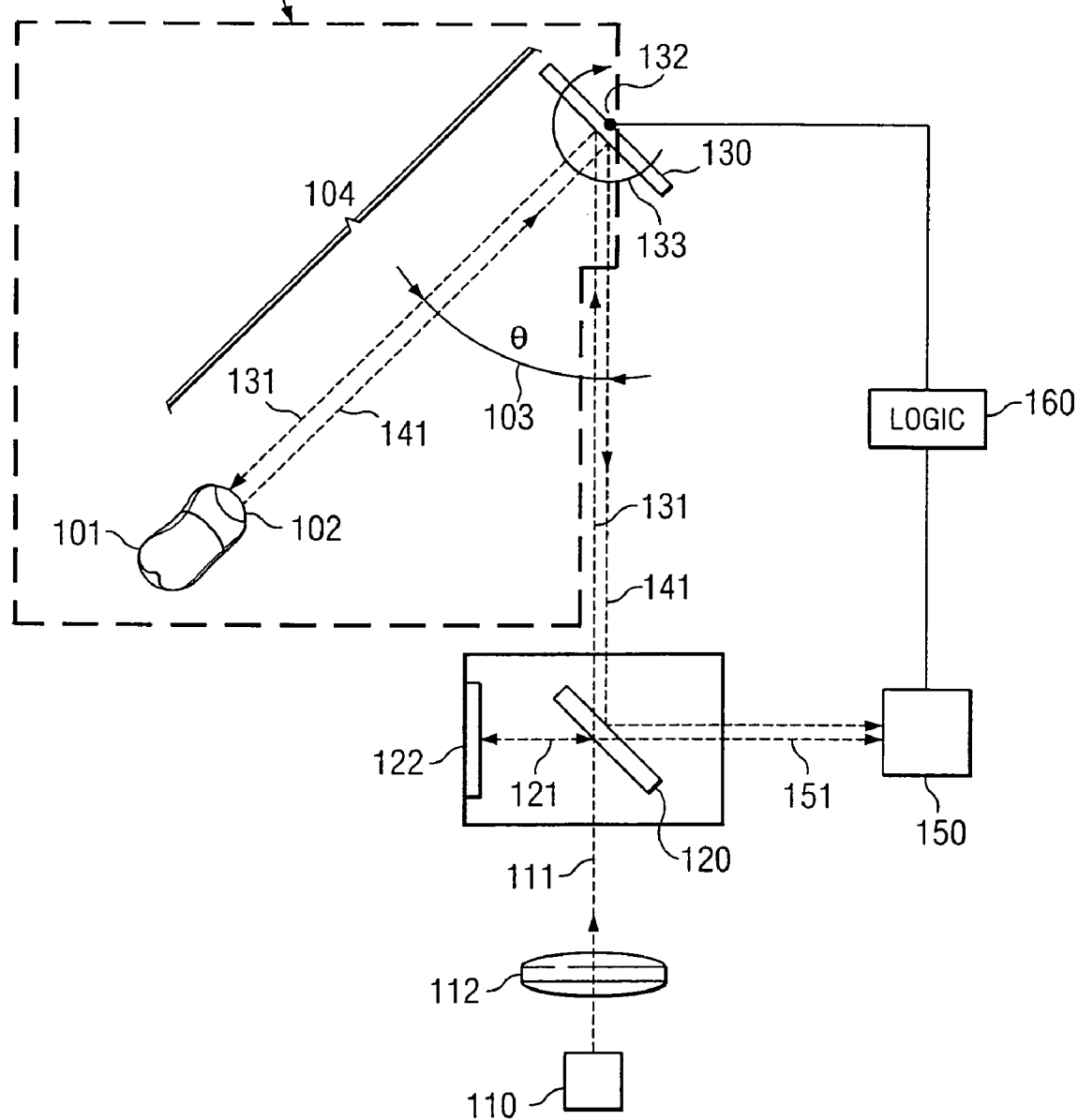
FIG. 1 is a schematic diagram of an embodiment in accordance with the invention for determining position.

FIG. 1 is a schematic diagram of a system for determining position arranged in accordance with the invention and used to determine the location of object 101 in two-dimensional space. In operation of the system of FIG. 1, source 110 projects a source beam 111 along a source path, and a collimator 112 collimates source beam 111. In the embodiment of FIG. 1, source 110 is a broadband or low-coherence source of electromagnetic radiation producing a broadband radiation beam. The embodiments are not limited to broadband or low-coherence radiation, but rather may use electromagnetic radiation of any degree of coherency. Arranged along the source path of FIG. 1 is beam splitter 120. In the embodiment of FIG. 1, beam splitter 120 is a partially reflective surface that can split source beam 111 into search beam 131 and control beam 121. The embodiments are not limited to a reflective surface oriented in the manner depicted in FIG. 1, but rather may use polarizing beam splitters, prisms, or other optical elements that will suitably split source beam 111. In the depicted embodiment, control beam 121 is directed by beam splitter 120 towards reflector 122 which redirects control beam into detector 150 along detector path 151. The partially reflective beam splitter 120 passes search beam 131 allowing it to strike redirector 130. In the embodiment as depicted in FIG. 1, redirector 130 is a reflective surface mounted on a pivot point 132. The embodiments are not limited to a pivoting reflective surface, but rather, may incorporate a prism, a refraction means, or any other device that moves, rotates, sweeps, or is otherwise capable of moving search beam 131 through a search area.

As further depicted in FIG. 1, redirector 130 moves through arc 133 (by a stepper motor, magnetic control, or any other appropriate means) causing search beam 131 to be panned through the substantially all of search area 140. If object 101 is located in the search area 140, search beam 131 will strike the object at some point during the movement of redirector 130. In the embodiment of FIG. 1, a retroreflector 102 is affixed to object 101. A retroreflector has the capability of reflecting an incident beam back along the incident path. If object 101 has a retroreflecting surface 102, for example a side affixed with 3M® retroreflecting tape, search beam 131 will hit object 101 and be reflected back along the incident path as location beam 141. Location beam 141 then strikes redirector 130 and is again directed along the same path traveled by search beam 131, but traveling in the opposite direction. Location beam 141 then strikes beam splitter 120 and is reflected by beam splitter 120 along detector path 151. Thus, when redirector 130 is at angle 103, location beam 141 and control beam 121 both arrive at the detector along detector path 151.

FIG. 1, also includes logic 160 to determine the angle of position for object 101. When the system detects the existence of a location beam 141, the system will note the angle of redirector 130 can be used to determine where the object is in relation to the system. If redirector 130 is defined as being at 0° when its surface is normal to the path of beam 131 as it is incident upon redirector 130, then the direction of object 101 can be determined. When redirector 130 is at angle 103, the system will generate location beam 141. If angle 103 corresponds to 30°, then the creation of location beam 141 means that an object lies along the 30° line.

To determine the position of an object in two dimensional space, two position coordinates should be known. For the embodiment of FIG. 1, location beam 141 and control beam 121 are used to interferometrically determine distance 104 and use the distance of object 101 from a reference point as a second position coordinate. Both location beam 141 and control beam 121 are incident upon detector 150. When combined, the beams will constructively and destructively interfere resulting in bright and dark interference bands measured at detector 150. Those interference bands have a contrast—how bright the bright is, or how dark the dark is—and this contrast is a direct function of the different path lengths traveled by location beam 141 and control beam 121. The embodiment of FIG. 1 uses a broadband or low-coherence source to produce a broadband source beam 111 that is split. The contrast of the interference bands, observed at the detector and created by the recombined beam, is used to calculate the difference in path lengths for control beam 121 and location/search beam 131, 141. When the known distance from splitter 120 to redirector 130 is removed, distance 140 remains. By analyzing the contrast function, the system of FIG. 1 thus determines distance 104. This method of distance determination is called low-coherence interferometry, and is further described in "Low-Coherence Interferometry," by A. F. Fercher, et al., Optics Letters 13, 186 (1988) incorporated herein by reference.

An embodiment in accordance with the invention uses low-coherence interferometry to determine distance 104. Other embodiments in accordance with the invention may include, but are not limited to, interferometric measurements based upon a plurality of discrete wavelengths or interferometric measurements based upon a single wavelength source. The method used should be appropriately matched with source 110. For example, if source 110 is a laser, a method of single wavelength interferometry may be employed. If a source emitting three wavelengths is used, a method of three wavelengths interferometry may be used.

The embodiment of FIG. 1 is depicted and described as locating an object in two-dimensional space. However, embodiments in accordance with the invention can also locate an object in three dimensions. For an arrangement as depicted in FIG. 1, redirector 130 could be readily adapted to pan search beam 131 through two arcs arranged orthogonally and each having a 0° orientation. When an object is located and a location beam is generated, the system could then note the angle of redirector 130 in each arc with respect to their respective 0° orientation. The two angles measured from redirector 130 combined with distance 104 provide the three position coordinates of a spherical coordinate system. Alternatively, collimator 112 may be used to provide a second angle of position if collimator 112 is a cylindrical lens, or other optical device, that elongates source beam 111 in one dimension that is perpendicular to propagation. Such elongation provides the capability of detecting object 101 if it is lifted off of a surface. A second angle of position can then be determined using an interferometric method such as described herein.

Figure 2:
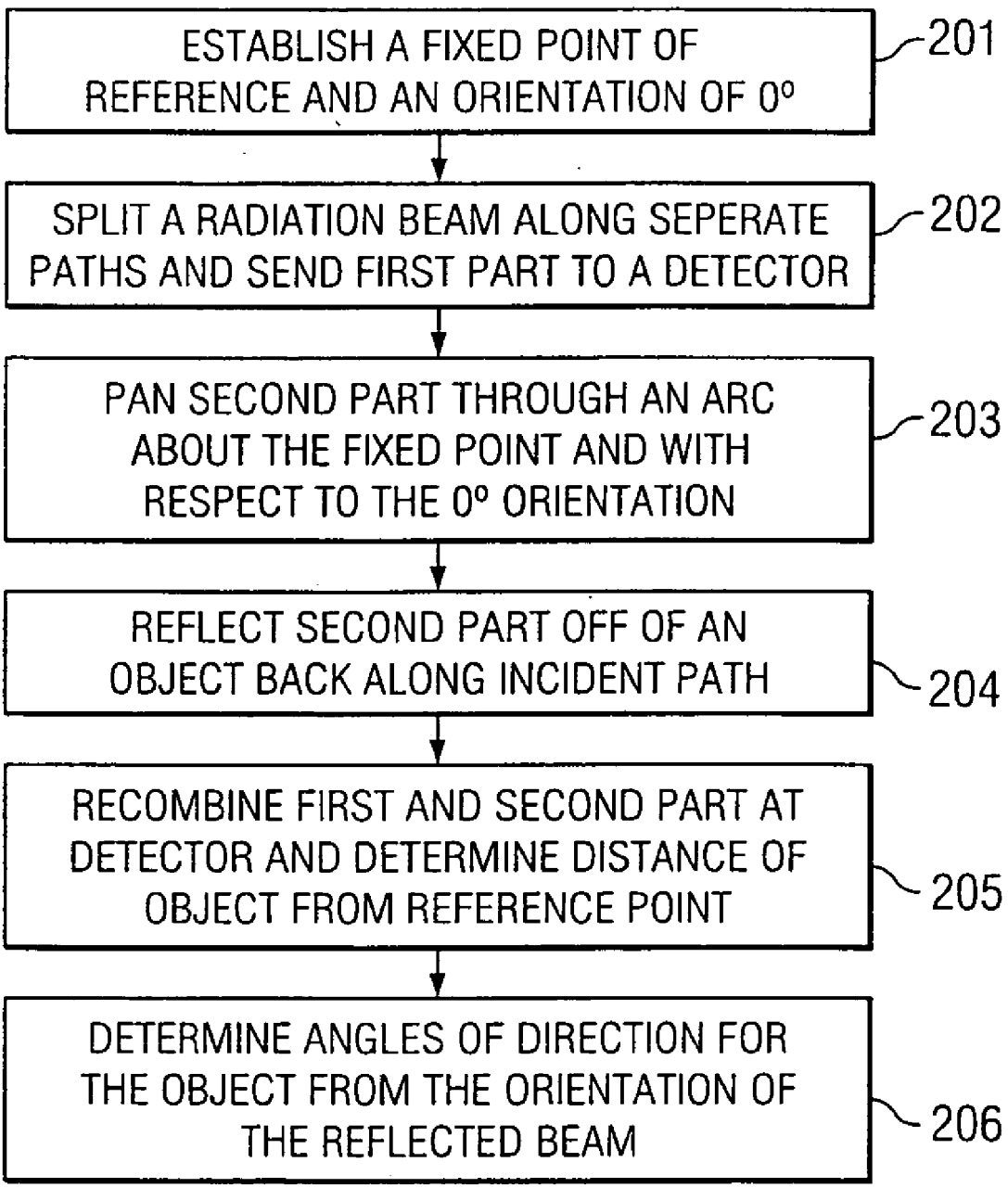
FIG. 2 is a flow chart illustrating a method of position determination and motion tracking in an embodiment in accordance with the invention.

In order to determine the position of an object relative to a fixed reference point, embodiments in accordance with the invention may use the generalized method 200 illustrated in FIG. 2. In step 201, a fixed point of reference and an orientation that corresponds to an angle of 0° are established. A two dimensional system may use polar coordinates and can use the fixed point of reference as an origin from which to measure distance, and can use the 0° orientation as a basis for measuring an angle. A three dimensional system may use spherical coordinates setting the fixed point of reference as an origin from which to measure distance, using the 0° orientation as a basis for measuring a first angle, and using another 0° orientation as a basis for measuring a second angle that is orthogonal to the first. In step 202, a source beam is divided or split into a control beam and a location beam. The control beam is then sent by a fixed path to a detector, while the search beam follows a separate path to the fixed point of reference. In step 203, the search beam is panned about the reference point and through an arc measured from the first 0° orientation. If a system is determining position in three dimensions, the search beam can be panned through a second arc (orthogonal to the first) that is measured from another 0° orientation. In step 204, a properly designed object within this arc (or arcs) reflects the search beam back along its incident path. A properly designed object is any object arranged so that it will reflect the search beam back along its incident path. One method affixes a retroreflector, a prismatic shape capable of reflecting incident light back along the incident path, to one surface of the object. An object affixed with a retroreflector can reflect a search beam (beam 131 of FIG. 1, for example) back along its incident path. The embodiments are not limited to the use of retroreflectors, but may be easily adapted to use any arrangement capable of reflecting a search beam back along the incident path. In step 205, this reflected beam is caused to recombine with the control beam, and the distance of the object, relative to the fixed point of reference, is determined from the interference pattern of the two beams. In step 206, the angle(s) of the search beam with respect to the 0° orientation(s) are determined. When combined, distance 104 and angle (θ) 103 define the position of object 101 in a two-dimensional space.

Embodiments in accordance with the invention may be used in determining the position and or tracking the motion of a mouse, stylus, or any other computer input device. Further, the embodiments in accordance with the invention can use any object to input location for a computer, as long as that object can be adapted to reflect the search beam as a location beam.

Figure 3:
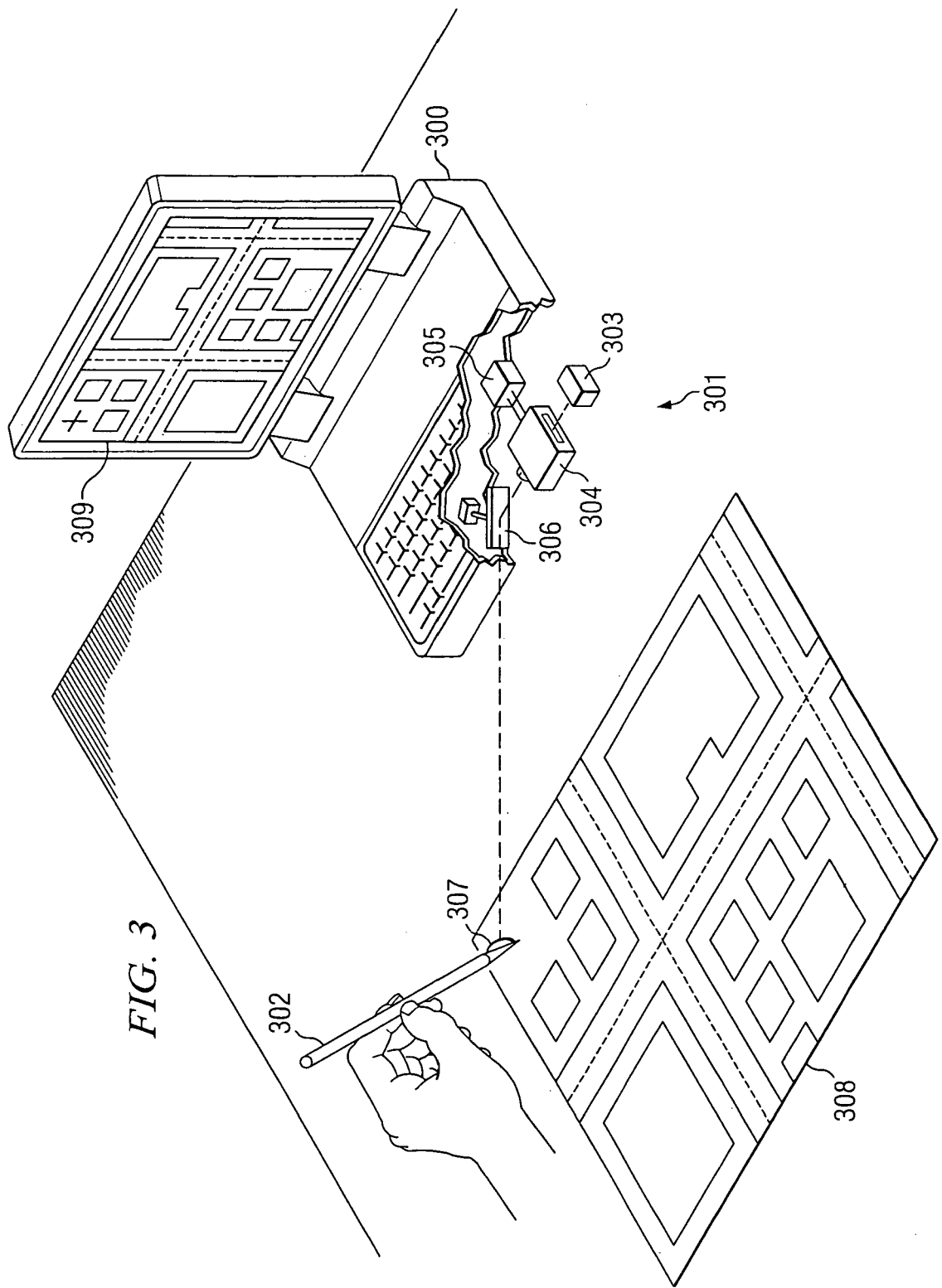
FIG. 3 is a diagram illustrating an embodiment in accordance with the invention arranged to determine the position and track the motion of a computer input device.

FIG. 3 is a diagram illustrating an embodiment arranged to determine the position and to track the motion of a computer input device. Exemplary computer system 300 has been adapted to use computer input system 301. System 301 allows a user to manipulate stylus 302 and provide location information to computer system 300 using a graphical user interface application 309. Broadband source 303 produces a beam that is split by splitter 304. The control beam is then directed toward detector 305, and the search beam is directed toward redirector 306. Redirector 306 pans the search beam across a work area, such as the surface of a table, desk, or other area. When the search beam strikes stylus 302, retroreflector 307 reflects the search beam back along the incident path as a location beam. The location beam is then redirected by system 301 to combine with the control beam at detector 305. By a method similar to those described above, the system then calculates the position of stylus 302 with respect to a fixed point. Repeated panning of the search beam results in repeated determination of the position of stylus 302. By storing the successive position determinations in memory, system 300 can track the motion of stylus 302 over time. Embodiments arranged in this manner can provide mouse, stylus, or other computer input applications that are superior to traditional motion relative applications.

Various embodiments in accordance with the invention allow the ability to track motion over any area and provide specific position information useful for numerous applications. For example, stylus 302 of FIG. 3 can be used to indicate a position on map 308, relaying this information to computer system 300. Stylus 302 could be used to trace objects on map 308, and system 301 would provide their location. System 301 can also be adapted to limit the positioning of stylus 302 to a fixed range, when the coherence length of the radiation emitted by source 303 is used to define a navigation area, such as search area 140 in FIG. 1.

Coherence Length is determined by the equation:

$$\text{Coherence Length} = \frac{\lambda^2}{LineWidth}$$

A source 303 emitting light of 850 nm and having a line width of 0.01 nm, will result in a coherence length of 7.2 cm, and a search area of a square with sides of approximately 5.1 cm. Such a system 301 can limit the detection of stylus 302 to within a reasonable geographic area (area 140 of FIG. 1, for example). This avoids wasting power and other resources by tracking a stylus across the room, or from tracking reflective objects outside the search area but still in the path of a search beam.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 4:
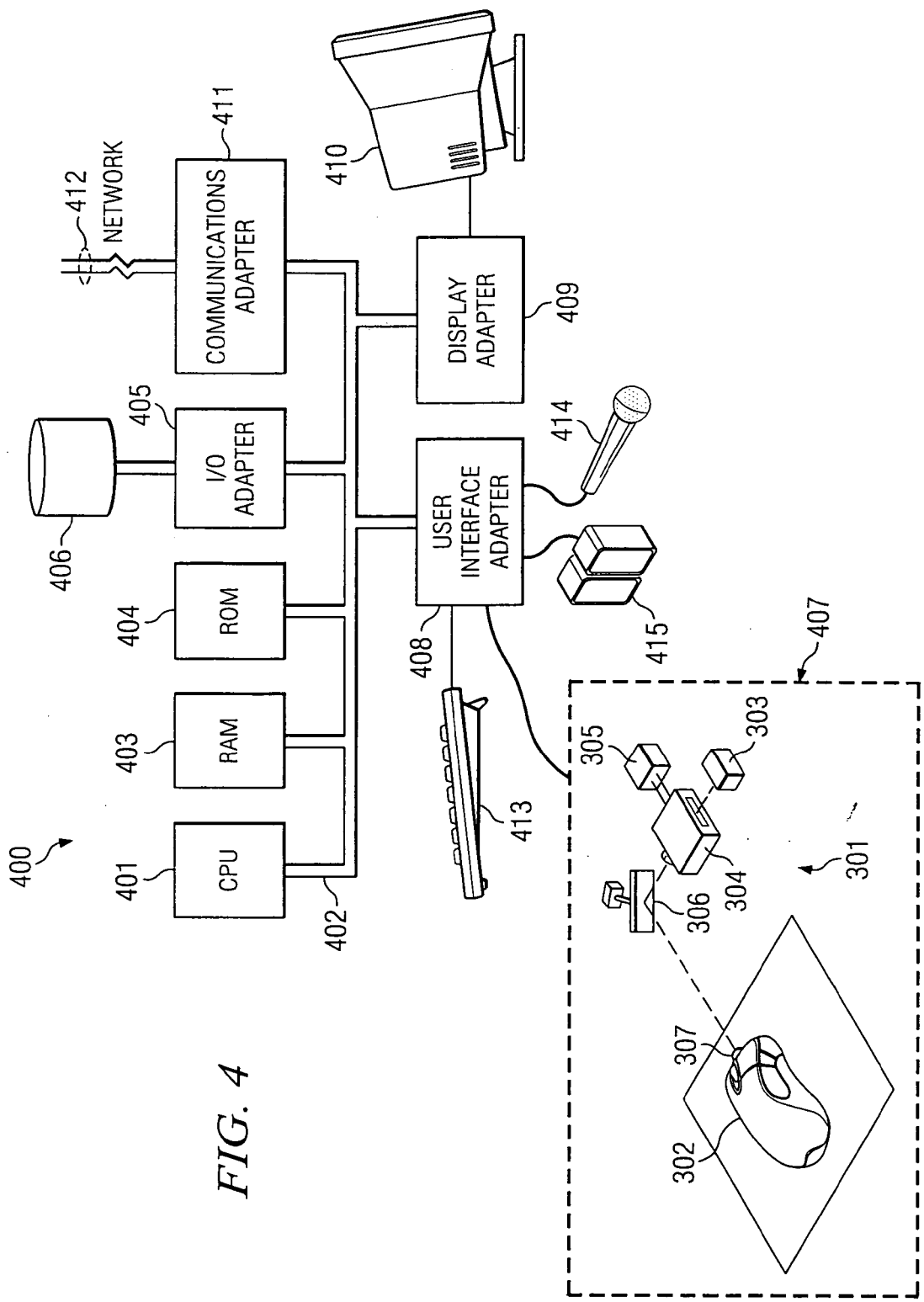
FIG. 4 illustrates an example computer system adapted according to embodiments in accordance with the invention.

FIG. 4 illustrates an exemplary computer system 400 adapted according to embodiments of the present invention. Central processing unit (CPU) 401 is coupled to system bus 402. CPU 401 may be any general purpose CPU, such as INTEL's PENTIUM® 4 processor, for example. However, the present invention is not restricted by the architecture of CPU 401 as long as CPU 401 supports the inventive operations as described herein. CPU 401 may execute the various logical instructions according to embodiments of the present invention.

Computer system 400 may include random access memory (RAM) 403, which may be SRAM, DRAM, SDRAM, or the like. Computer system 400 may also include read-only memory (ROM) 404 which may be PROM, EPROM, EEPROM, or the like. RAM 403 and ROM 404 hold user and system data and programs, as is well known in the art.

Computer system 400 also may include input/output (I/O) adapter 405, communications adapter 411, user interface adapter 408, and display adapter 409. I/O adapter 405, user interface adapter 408, and/or communications adapter 411 may, in certain embodiments, enable a user to interact with computer system 400 in order to input information, associated with switches, such as mouse buttons. Communications adapter 411 may also provide communication to network 412.

I/O adapter 405 may connect to storage device(s) 406, such as one or more of hard drive, compact disc (CD) drive, floppy disk drive, tape drive, etc. to computer system 400. The storage devices may be utilized when RAM 403 is insufficient for the memory requirements associated with storing data for tracking the motion of an object. User interface adapter 408 couples user input devices, such as keyboard 413, position determining system 407 (such as the system embodiment illustrated in FIG. 1), and microphone 414 and/or output devices, such as speaker(s) 415 to computer system 400. Display adapter 409 is driven by CPU 401 to control the display on display device 410 to, for example, display the user interface of embodiments of the present invention.

The present invention is not limited to the architecture of system 400. For example, any suitable processor-based device may be utilized, including without limitation personal computers, laptop computers, computer workstations, and multi-processor servers. Moreover, embodiments in accordance with the invention may be implemented on application specific integrated circuits (ASICs) or very large scale integrated (VLSI) circuits.

What is claimed is:

1. A method for determining a position of an input object for a processor-based system, said method comprising:

determining at least one angle of position for said object by moving a search beam through a search area, wherein said search beam is reflected off said object creating a location beam when said search beam is at said at least one angle of position; and determining a distance of said object from a reference point by analyzing an interference pattern created by combining said location beam and a control beam, wherein said distance and said at least one angle of position describes said position for use by said processor based system.

2. The method of claim 1 further comprising:
tracking a motion of said object by determining said position of said object a plurality of times.

3. The method of claim 1 wherein said search beam is panned through an arc, and wherein said arc corresponds to a polar coordinate.

4. The method of claim 1 wherein said search beam is panned through at least a first arc and a second arc, wherein said first arc and second arc correspond to a first spherical coordinate and a second spherical coordinate.

5. The method of claim 1 wherein said search beam is elongated in at least one direction perpendicular to the direction of propagation, and wherein said interference pattern is analyzed to determine a second angle of position.

6. The method of claim 1 further comprising:
splitting a source beam to create said search beam and said control beam.

7. The method of claim 1 further comprising:
fitting said object with a retroreflector.

8. The method of claim 1 wherein said object is a computer input device.

9. The method of claim 8 wherein said computer input device is a computer mouse.

10. A system to determine a position for input to a processor based application, said system comprising:
a redirector that moves in at least one dimension about a fixed point;
an object for indicating a position to provide input for said application, said object operable to reflect a search beam as a location beam;
logic operable to determine at least one angle of position from an orientation of said redirector; and
logic operable to determine a distance of said object from said fixed point.

11. The system of claim 10 further comprising:
a splitter operable to split a source beam into a control beam and said search beam;
optics arranged to combine said location beam and said control beam;
a detector responsive to an interference pattern created by said combination; and
wherein said logic operable to determine distance analyzes said interference pattern to determine said distance.

12. The system of claim 10 further comprising:
logic operable for tracking motion of said object by repeatedly determining its position.

13. The system of claim 10 further comprising:
a retroreflector affixed to said object.

14. The system of claim 10 further comprising:
a reflector oriented to reflect the location beam along the same path as the control beam.

15. The system of claim 10 wherein the object is a mouse.

16. The system of claim 10, said system further comprising:
logic operable to determine a second angle of position from said orientation of said redirector, and wherein said redirector moves in a second dimension about said fixed point.

* * * * *